(12) United States Patent
O'Sullivan et al.

(10) Patent No.: US 8,204,196 B2
(45) Date of Patent: Jun. 19, 2012

(54) NOTIFICATION TO ABSENT TELECONFERENCE INVITEES

(75) Inventors: Patrick J. O'Sullivan, Dublin (IE); Edith H. Stern, Yorktown Heights, NY (US); Robert C. Weir, Westford, MA (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 12/146,321

(22) Filed: Jun. 25, 2008

(65) Prior Publication Data

US 2009/0323916 A1 Dec. 31, 2009

(51) Int. Cl.
*H04M 3/42* (2006.01)
(52) U.S. Cl. ............. 379/202.01; 370/260; 709/204
(58) Field of Classification Search ............. 379/202.01, 379/203.01; 370/260; 709/204
See application file for complete search history.

(56) References Cited

U.S. PATENT DOCUMENTS

| 5,909,543 | A  | * | 6/1999 | Tanaka et al. ............ 709/204 |
| 6,378,771 | B1 | * | 4/2002 | Cooper ..................... 235/382 |
| 6,870,916 | B2 | * | 3/2005 | Henrikson et al. ....... 379/202.01 |
| 7,295,657 | B1 |   | 11/2007 | Keohane et al. |
| 7,298,831 | B1 |   | 11/2007 | Keohane et al. |
| 7,305,078 | B2 |   | 12/2007 | Kardos |
| 2003/0158900 | A1 | * | 8/2003 | Santos ..................... 709/205 |
| 2003/0233416 | A1 |   | 12/2003 | Beyda et al. |
| 2003/0233417 | A1 |   | 12/2003 | Beyda et al. |
| 2005/0014490 | A1 |   | 1/2005 | Desai et al. |
| 2005/0021344 | A1 |   | 1/2005 | Davis et al. |
| 2006/0109811 | A1 | * | 5/2006 | Schotten et al. ............. 370/328 |
| 2007/0116226 | A1 | * | 5/2007 | Bennett et al. ........... 379/202.01 |
| 2011/0044436 | A1 | * | 2/2011 | Tam et al. .................. 379/88.19 |

* cited by examiner

*Primary Examiner* — Creighton Smith
(74) *Attorney, Agent, or Firm* — Steven L. Nichols; VanCott, Bagley, Cornwall & McCarthy P.C.

(57) ABSTRACT

A method includes receiving an indication of an elapsed time since a scheduled teleconference meeting start and attendance of the teleconference meeting, determining from the indication whether to issue a notification to an absent invitee of the teleconference meeting, and selectively issuing the notification to the absent invitee.

20 Claims, 13 Drawing Sheets

NOTIFICATION TO ABSENT TELECONFERENCE INVITEES

BACKGROUND OF THE INVENTION

In teleconferencing, live information is exchanged among meeting participants that are in any number of different geographic locations remote from one another but linked by a telecommunications system. Teleconferencing thus provides an alternative to people who need to meet and communicate in real-time, but cannot be geographically in the same place for reasons of distance, cost, practicality, etc. Participants in a teleconference meeting usually meet together for a specific task at a specific time.

For example, in some types of teleconference meetings, each participant may have access to a microphone to transmit his or her voice to other participants in the teleconference meeting and an audio speaker to hear the voices of other participants in the teleconference. Such a teleconference can be conducted by telephone. In more sophisticated examples, screens and cameras can also be used to share images or electronic data among participants in the teleconference.

In some cases, participants join and participate in a teleconference meeting by dialing into a central conferencing service by telephone. In other types of teleconference meetings, the participants may exchange data by mutual connections to a teleconference server via a computer network, such as the Internet.

In addition to the voice and, in some cases, video that is part of a teleconference, some teleconference services provide further data to participants. Such data can include additional forms of communication (e.g. a framework for electronic chatting among participants) and/or information regarding other participants in the teleconference, such as the time at which each participant enters the teleconference meeting. Due to the increasing importance of teleconferences to teams and business relationships that operate long-distance, features that enhance the teleconference experience or teleconferencing efficiency are of significant value.

BRIEF SUMMARY OF THE INVENTION

A method includes receiving an indication of at least one of an elapsed time since a scheduled teleconference meeting start and attendance at the teleconference meeting, determining from the indication whether to issue a notification to an absent invitee of the teleconference meeting, and selectively issuing the notification to the absent invitee as needed.

A teleconference system includes a plurality of conferencing devices and a conferencing service module communicatively coupled to the conferencing devices. The conferencing service module is configured to determine if an invitee of a teleconference meeting is absent and issue a notification to the invitee in response to a predetermined set of conditions being met.

A computer program product for teleconferencing includes a computer usable medium having computer usable program code embodied therewith. The computer usable program code includes computer usable program code configured to receive an indication of at least one of an elapsed time since a scheduled teleconference meeting start and attendance at said teleconference meeting, computer usable program code configured to determine from the indication whether to issue a notification to an absent invitee of the teleconference meeting, and computer usable program code configured to selectively issue the notification to the absent invitee as needed.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION OF THE INVENTION

Figure 1:
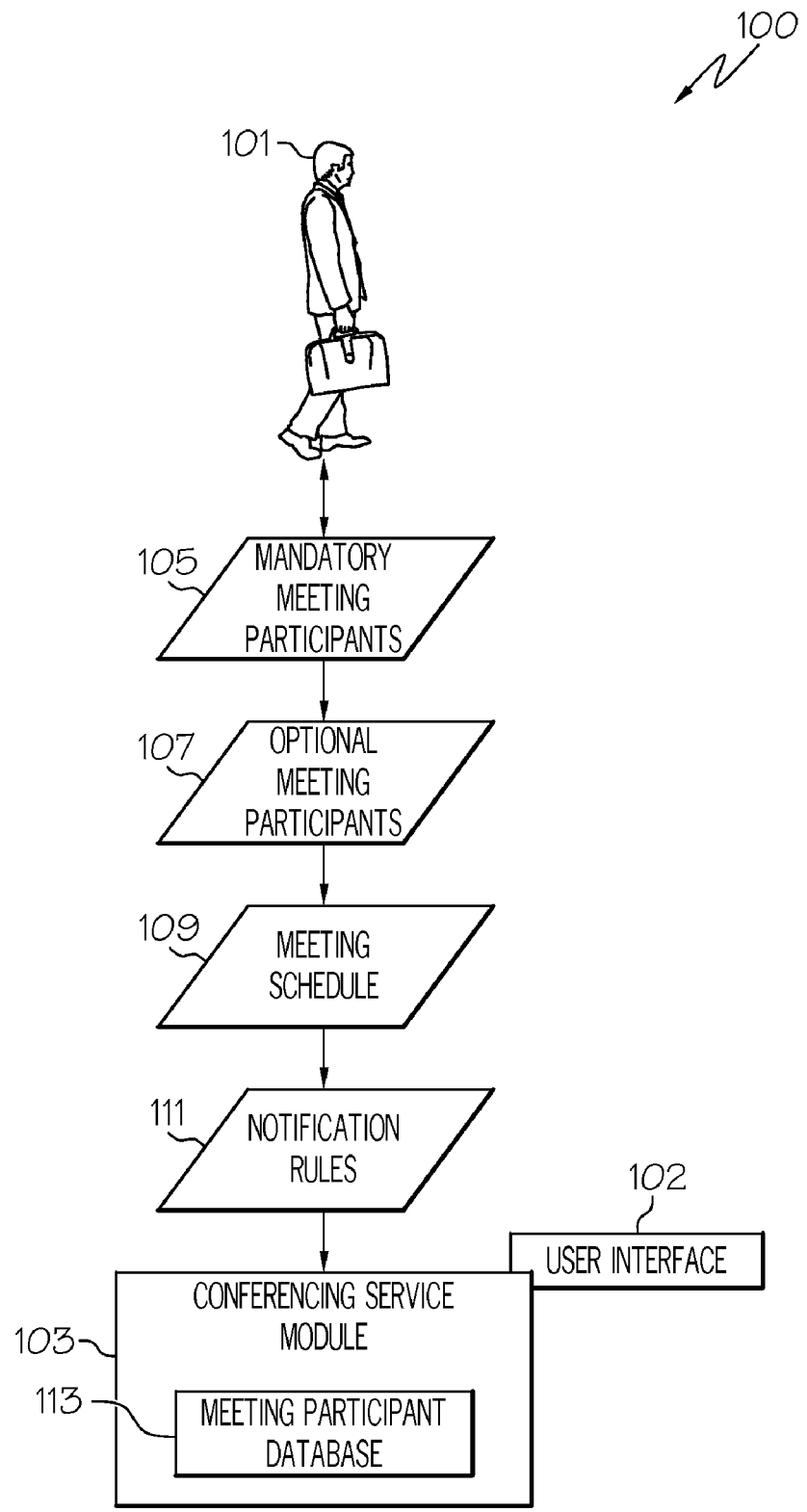
FIG. 1 is a diagram of an illustrative system for configuring a future teleconference, according to one exemplary embodiment of principles described herein.

As described above, teleconferencing provides for the exchange of live information among meeting participants that are remote from one another but linked by a telecommunications system. Under some circumstances, this type of meeting can present a significant savings in human and fiscal resources over meetings in which all of the participants gather to a single site.

However, it is often the case that teleconference meetings do not begin according to schedule, due to absence on the part of one or more of the participants. Teleconference participants may be absent at the appointed hour for a variety of reasons, including, but not limited to, demanding schedules, projects or other meetings that run late, unforeseen circumstances, and a disregard for punctuality. In such cases, other participants in the teleconference meeting may chat idly, do other work, or start the teleconference meeting without the missing participants.

In some situations, the absence of a key participant may prevent other participants from proceeding with the teleconference meeting. Thus, tardy or absent participants in a teleconference meeting can result in a loss of time by other participants in the teleconference meeting, which can be costly. However, it is often the case that tardy or absent participants can be induced to join a scheduled teleconference meeting by simply reminding them of the meeting and requesting their participation. Therefore, it may be desirable to notify absent or tardy teleconference meeting participants of scheduled meetings prior to an excessive loss of time by the other teleconference meeting participants.

In light of these and other goals, the present specification discloses methods and systems for providing notifications to teleconference meeting invitees who are not present after the scheduled start of a meeting. Various criteria may be used to determine when such a notification should be sent.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, a diagram of an illustrative system (100) for configuring a teleconference meeting is shown. The teleconference meeting may be configured by a scheduler (101) using a conferencing service module (103). The scheduler (101) may be a participant in the teleconference meeting or simply one who is in charge of setting up the teleconference meeting with the conferencing service module (103).

The conferencing service module (103) may be configured to perform at least the functions of scheduling a teleconference according to a set of teleconference parameters (105, 107, 109, 111) and automatically identifying and/or providing notification to invitees of the teleconference. In certain embodiments, the conferencing service module (103) may include multiple subsystems configured to perform certain functions. In some cases, these subsystems may not necessarily be implemented together on a common computing device or article of software, or even using a common infrastructure. For example, a first subsystem of the conferencing service module (103) may be configured to perform a calendaring function while a second, separate subsystem of the conferencing service module (103) may be configured to identify or provide notifications to invitees of the scheduled teleconference. In some examples, different subsystems of the conferencing service module (103) may operate independently and not necessarily need to communicate with each other.

In certain embodiments, the teleconference parameters (105, 107, 109, 111) may include a mandatory meeting participants parameter (105), an optional meeting participants parameter (107), a meeting schedule parameter (109), and a notification rules parameter (111). The mandatory meeting participants parameter (105) and the optional meeting participants parameter (107) may designate individual invitees to the teleconference meeting and whether these invitees are essential for, or required to attend, the meeting. The meeting schedule parameter (109) may designate a scheduled start time. In some examples, the meeting schedule parameter (109) may also specify a scheduled duration for the meeting. The notification rules parameter (111) may be used to designate under what circumstances reminder notifications will be sent to absent meeting invitees, as will be explained in more detail below.

In certain embodiments, at least some of the teleconference parameters (105, 107, 109, 111) may be provided by the scheduler (101) to the conferencing service module (103). Additionally or alternatively, at least some of the teleconference parameters (105, 107, 109, 111) may be determined by the conferencing service module (103) programmatically according to previously defined rules or data, such as preconfigured group policies or calendaring default settings. In certain embodiments, a combination of parameters provided by the scheduler (101) and programmatically generated parameters may be used to schedule and/or implement a meeting.

In certain embodiments, one or more subsystems of the conferencing service module (103) may be configured to establish contact with each of the invited participants in a teleconference meeting and interconnect the participants to allow the exchange of information. For example, certain subsystems in the conferencing service module (103) may provide the functionality through which teleconference meeting invitees may call in to join a teleconference meeting or access the teleconference meeting using a networked computing device. The conferencing service module (103) may include one or more computing devices, executable code installed thereon, storage media, and communication devices, including voice-over-Internet-Protocol (VoIP) functionality, to accomplish these tasks.

In certain embodiments, the scheduler (101) may be able to provide the teleconference parameters (105, 107, 109, 111) to the conferencing service module (103) through a user interface (102) provided to the scheduler (101) directly or via a network connection. However, as indicated above, each of the various parameters (105, 107, 109, 111) can either be entered by a user through the interface (102) or generated by the conferencing service module base on other user input or commands through the interface (102).

The conferencing service module (103) may be configured to access a meeting participant database (113) that stores data related to each of the invited participants, such as a corporate directory or corporate email system. Such a corporate directory or other meeting participant database (113) may include contact and/or calendaring information for each of the invitees to a scheduled teleconference meeting. This information may be used by the conferencing service module (103) during the initial scheduling of a teleconference meeting and/or for providing later notifications to the invitees. The conferencing service module (103) may also generate, receive, store, or at least have access to, the mandatory meeting participants parameter (103) and optional meeting participants parameter (107) indicating whether each invited participant is invited as a mandatory or optional participant. The conferencing service module (103) may also match this information with an indication whether the invited participants have accepted or declined an invitation to the meeting. Additionally or alternatively, this information may also be provided to the conferencing service module (103) by the scheduler (101).

Figure 2:
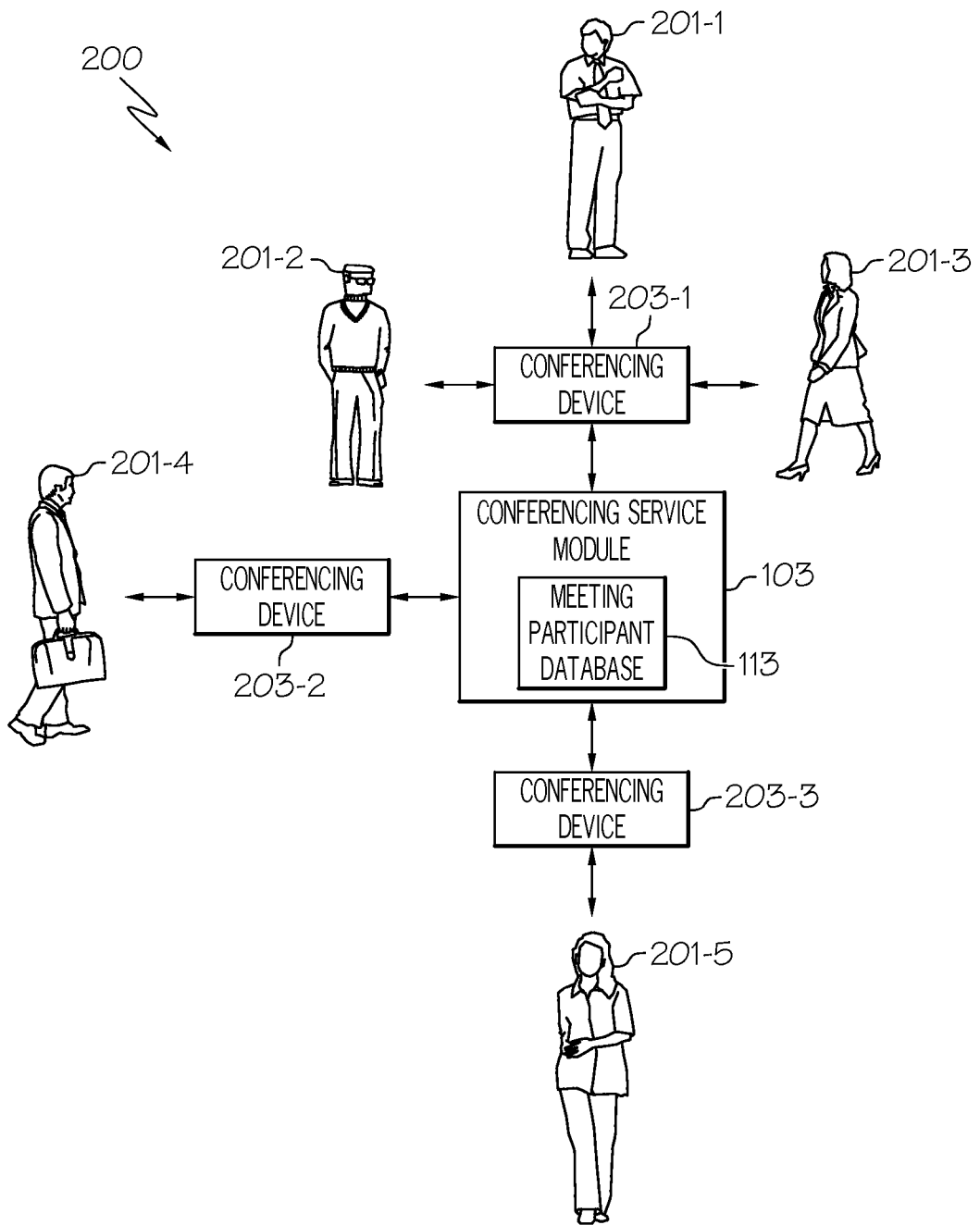
FIG. 2 is a diagram of an illustrative teleconference system, according to one exemplary embodiment of principles described herein.

With reference now to FIG. 2, a diagram of an illustrative teleconference meeting (200) is shown. In the teleconference meeting (200), a plurality of participants (201-1 to 201-5) in a variety of locations may exchange information via connections to the conferencing service module (103). The conferencing service module (103) may be configured to receive information from any one of the participants (201-1 to 201-5) and route that information to the remaining participants (201-1 to 201-5).

At each location having participants (201-1 to 201-5) in the teleconference meeting (200), a conferencing device (203-1 to 203-3) may be present. The conferencing devices (203-1 to 203-3) may be configured to provide information to, and receive information from, the participants (201-1 to 201-5) in the teleconference meeting (200). Examples of suitable conferencing devices (203-1 to 203-5) may include, but are not limited to, telephones, personal computers, video cameras, screens, microphones, and speakers.

In certain examples, the conferencing devices (203-1 to 203-3) may be shared by more than one of the participants (201-1 to 201-5). In the present example, for instance, three of the participants (201-1 to 201-3) gathered at a common location may share a conferencing device (203-1) such as a speakerphone or screen and camera set.

The conferencing service module (103) may be configured make use of one or more teleconference attendee identification techniques. In certain embodiments, this may entail a conferencing service module (103) receiving an indication as each of the participants (201-1 to 201-5) joins the teleconference meeting (200). The indications may identify each of the participants (201-1 to 201-5) specifically and allow the conferencing service module (103) to maintain a dynamic record of attendance at the teleconference meeting (200).

These indications may be received digitally by one or more subsystems of the conferencing service module (103) and may be implemented in any way that may suit a particular application of the principles described herein. For example, in embodiments utilizing telephones as one or more of the conferencing devices (203-1 to 203-3), the indications provided to the conferencing service module (103) may include a personal code or password dialed by a participant (201-4) or a caller ID-recognized telephone number that identifies that participant (201-4) to the conferencing service module (103) as having joined the teleconference meeting (200). Additionally or alternatively, these indications may be provided to the conferencing service module (103) using voice recognition, facial recognition, login parameters from a computing device, or any other means that may suit a particular application. In certain embodiments, an indication provided by one participant (201-1) may identify the presence of additional participants (201-2, 201-3) that may be using the same conference device (203-1) as the participant (201-1) providing the indication.

Using these techniques, the conferencing service module (103) may be able to identify the participants (201-1 to 201-5) of the teleconference meeting (200) and match each of the participants (201-1 to 201-5) to corresponding data in the meeting participant database (113). The conferencing service module (103) may also be configured to determine if any of the invited participants (201-1 to 201-5) are absent from the teleconference meeting (200), using the meeting participant database (113) in conjunction with identifying which of the participants (201-1 to 201-5) are present.

Figure 3:
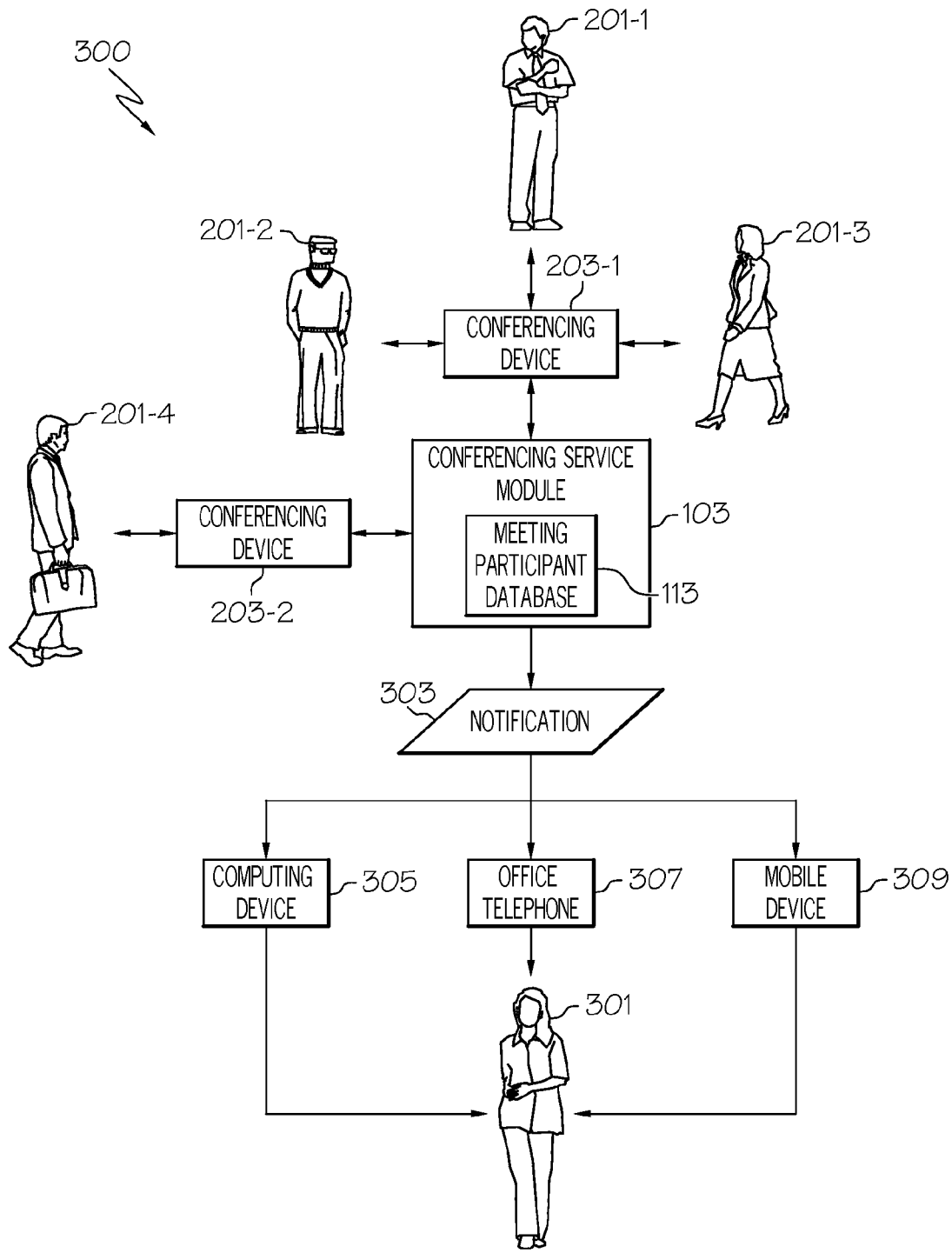
FIG. 3 is a diagram of an illustrative teleconference system, according to one exemplary embodiment of principles described herein.

With reference now to FIG. 3, a diagram of a teleconference meeting (300) is shown in which one of the invitees (301) has not joined the teleconference meeting (300) after the scheduled start time. Other participants (201-1 to 201-4) may have already joined the teleconference meeting (300) and be waiting on the absent invitee (301) to join in order to proceed with the business of the meeting (300).

The conferencing service module (103) may be configured to provide a notification (303) to the absent invitee (301) upon the expiration of a predetermined "grace period" of elapsed time from the scheduled start of the teleconference meeting (300). Whether or when such a notification is sent will depend on the teleconference parameters (105, 107, 109, 111; FIG. 1) provided to the conferencing service module (103) either programmatically or by the scheduler (101, FIG. 1) prior to the start of the teleconference meeting (300).

One or more grace periods may be established as parameters for each teleconference meeting (300) by a scheduler (101, FIG. 1). For example, the grace period(s) applying to a particular invited participant (201-1 to 201-4, 301) may be dependent on the rank of the invited participant (201-1 to 201-4, 301) within a certain organization, a rank of the scheduler (101, FIG. 1) or meeting requester (not shown) compared to the rank of the invited participant (201-1 to 201-4, 301), a designation of the invited participant (201-1 to 201-4, 301) as an mandatory or optional participant, a designation of the invited participant (201-1 to 201-4, 301) as moderator or non-moderator, or any other criteria that may suit a particular application of the present principles. In some embodiments, different grace periods rule may apply to certain of the invited participants (201-1 to 201-4, 301) in the teleconference meeting (300) and not to others. Additionally or alternatively, global grace period rules may be designated by a scheduler (101, FIG. 1) or other administrator as applying to all invited participants (201-1 to 201-4, 301) in the teleconference meeting (300).

In various embodiments, the conferencing service module (103) may be configured to communication with at least one of an absent invitee's computing device (305), office telephone (307), or mobile device (309) to provide a notification (303) of the teleconference meeting to the absent invitee (301) through one or more of these devices. The notification (303) may be configured to remind the absent invitee (301) of the teleconference meeting (300) and/or request that the absent invitee (301) immediately join the teleconference meeting (300). Depending on whether it is issued to the computing device (305), the office telephone (307), or the mobile device (309) of the absent invitee (301), the notification (303) may take on different formats. By way of example and not limitation, if the notification (303) is issued to the computing device (305), it may be in the form of an instant message, e-mail, or pop-up window on the screen of the computing device (305). When issued to the office telephone (307), the notification (303) may be in the form of a recorded audio message telephone call, and a notification (303) issued to a mobile device (309) may be in the form of a text message, telephone call, e-mail, or instant message. Any other device or means of notifying an absent invitee of his or her obligation to participate in the teleconference meeting may be used.

In certain examples, the notification (303) may be sent concurrently to each device (305, 307, 309) associated with the absent invitee (301) to which the conferencing service module (103) is communicatively coupled. In other examples, the notification (303) may be sent to only one of the devices (305, 307, 309), or may cycle through the devices (305, 307, 309). Additionally or alternatively, the method of notifying the absent invitee (301) may be based on a hierarchy of preferred contact methods and/or on presence information. In some embodiments, notifications (303) may be sent to more than one absent invitee (301) at once. For example, the conferencing service module (103) may cycle through notification methods associated with records of each absent mandatory invitee and provide notifications (303) using each available method until the absent mandatory invitee joins the teleconference meeting (300) or all possible contact methods are exhausted.

Figure 4:
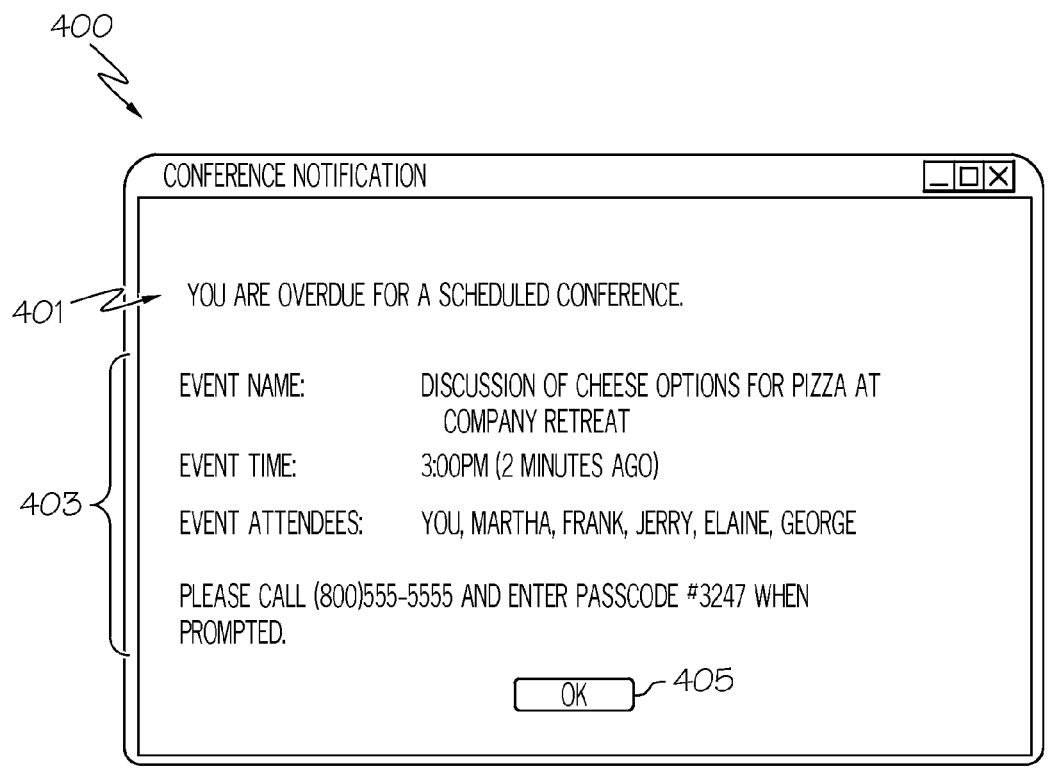
FIG. 4 is a diagram of an illustrative notification in a teleconference system, according to one exemplary embodiment of principles described herein.

With reference now to FIG. 4, a diagram is shown of an illustrative notification (400) according to one exemplary embodiment of the principles described above. In the present example, the illustrative notification (400) is an instant message window configured to be displayed by a computing device (305, FIG. 3) corresponding to an absent invitee (301, FIG. 3). The computing device (305, FIG. 3) may be configured to run software specific to the teleconferencing system or some other type of notification software that allows the conferencing service module (103, FIG. 3) to issue the notification (400) to the absent invitee (301, FIG. 3). In certain embodiments, the notification (400) may appear in a workspace of the absent invitee (301, FIG. 3) over or above other applications displayed by the screen of the computing device (305, FIG. 3).

The illustrative notification (400) may include a statement (401) to the absent invitee (301, FIG. 3) that the absent invitee (301, FIG. 3) is overdue for the scheduled teleconference meeting (300, FIG. 3). Details (403) of the scheduled teleconference meeting (300, FIG. 3) may also be displayed to the absent invitee (301, FIG. 3) in the notification (400) that may include, but are not limited to, a meeting name, a meeting schedule, a list of other invited participants in the teleconference meeting, and instructions for joining the teleconference meeting (300, FIG. 3). By clicking a confirmation button (405), the absent invitee (301, FIG. 3) may acknowledge to the central conference service module (103, FIG. 3) that the notification (400) has been received.

Figure 5:
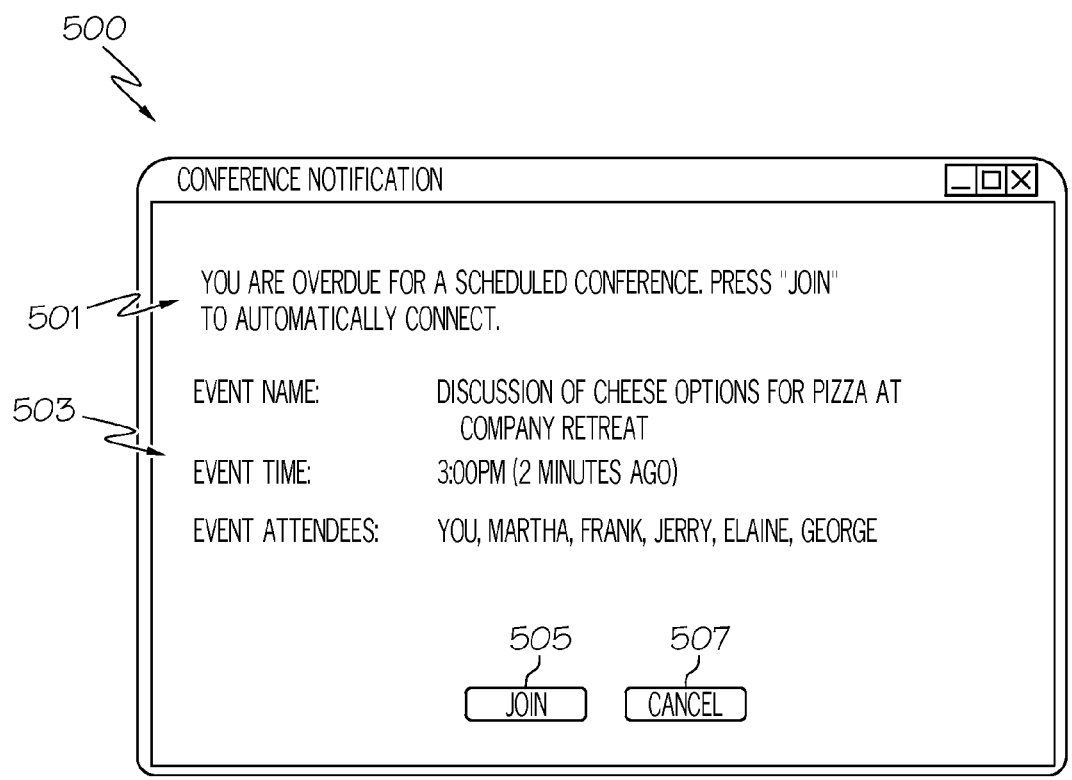
FIG. 5 is a diagram of an illustrative notification in a teleconference system, according to one exemplary embodiment of principles described herein.

With reference now to FIG. 5, a diagram of another illustrative notification (500) is shown according to one exemplary embodiment of the principles described above. The illustrative notification (500) of the present example may be included an instant message window having a reminder statement (501) and details (503) of the scheduled teleconference meeting (300, FIG. 3) consistent with the illustrative notification (400, FIG. 4) described in reference to FIG. 4.

In the present example, the notification (500) may also provide direct means by which the absent invitee (301) may join the teleconference meeting (300, FIG. 3), for example, using a connection to a public switched telephone network (PSTN), a voice over internet protocol (VOIP) connection, or any other connection that may suit a particular application of the principles herein. In some embodiments, this means may be in the form of a "Join" button (505) or similar means of dynamic input. By selecting the "Join" button (505), the absent invitee (301, FIG. 3) may be automatically connected to the teleconference meeting (300, FIG. 3) through the appropriate connection. In certain embodiments where the teleconference meeting (300, FIG. 3) is being held via networked computing devices, the "Join" button (505) may execute the appropriate software on the computing device (305, FIG. 3) of the absent invitee (301, FIG. 3) and, in some cases, provide necessary credentials to allow the absent invitee (301, FIG. 3) to participate in the teleconference meeting (300, FIG. 3). In some embodiments where the teleconference meeting (300, FIG. 3) is being held via telephone, the "Join" button (505) may cause the conferencing service module (103, FIG. 3) to call a phone number associated with the absent invitee (301, FIG. 3) and connect the absent invitee (301, FIG. 3) to the teleconference meeting (300, FIG. 3) when the telephone is answered by the absent invitee (301, FIG. 3). Notifications received by the absent invitee (301, FIG. 3) through his or her office telephone (307, FIG. 3) or mobile device (309, FIG. 3) may allow the absent invitee to connect directly to the teleconference meeting (300, FIG. 3) using similar principles. In certain embodiments the absent invitee (301, FIG. 3) may refuse to join the teleconference meeting (300, FIG. 3) by selecting a "cancel" button (507). Taking such an action may, in some cases, be reported to the conferencing service module (300, FIG. 3) and possibly to other participants in the teleconference meeting (300, FIG. 3).

Figure 6:
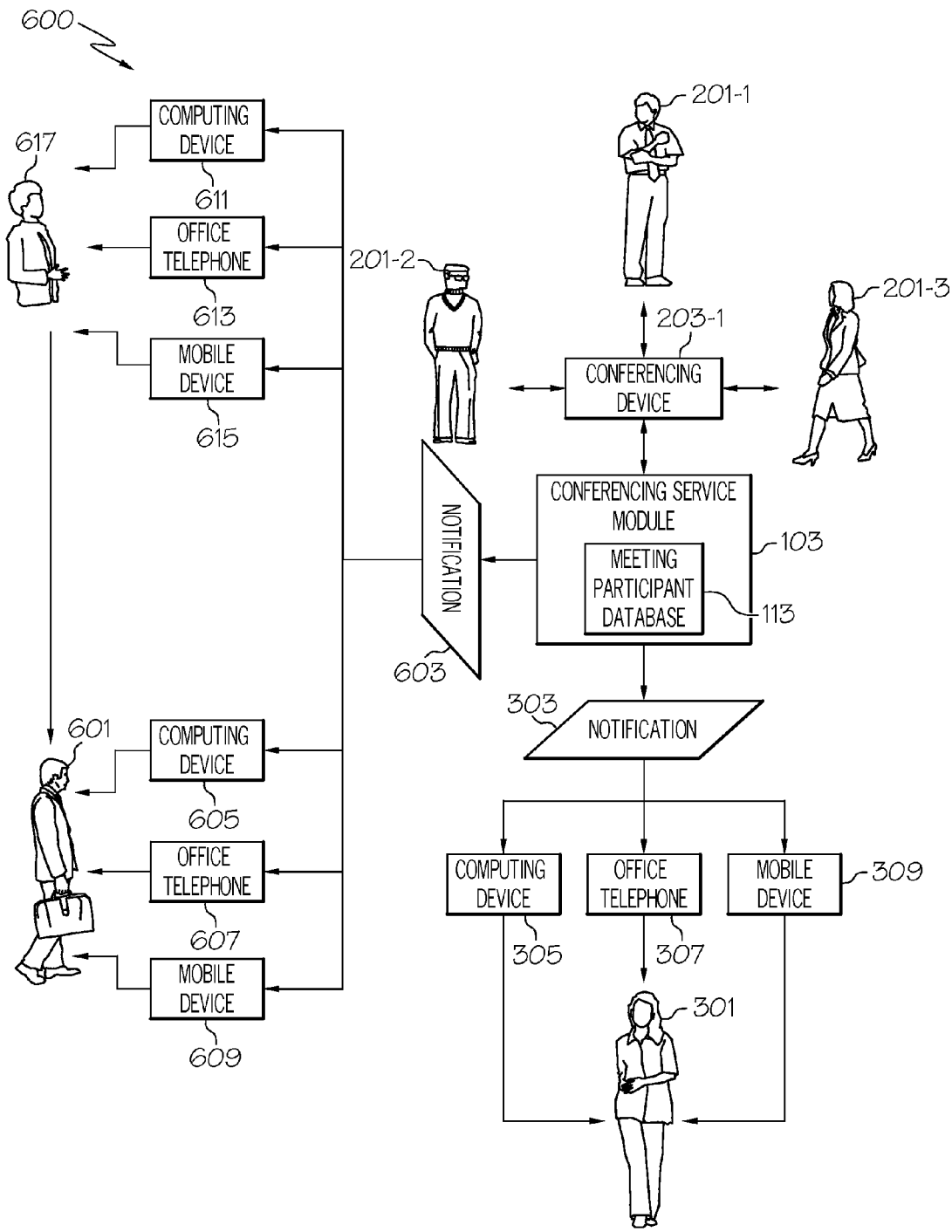
FIG. 6 is a diagram of an illustrative teleconference system, according to one exemplary embodiment of principles described herein.

Referring now to FIG. 6, a diagram of another illustrative teleconference meeting (600) scenario is shown. In the present example, two invitees (301, 601) to the teleconference meeting (600) may be absent with expired grace periods after the scheduled meeting start. The conferencing service module (103) may create notifications (303, 603) to the absent invitees (301, 601) through one or more of the computing devices (305, 605) of the absent invitees (301, 601), the office telephones (307, 607) of the absent invitees (301, 601), and the mobile devices (309, 609) of the absent invitees (301, 601), consistent with principles described above. Additionally, a notification (603) may be created and issued to one or more of a computing device (611), an office telephone (613), and a mobile device (615) of an assistant (617) to one of the absent invitees (601). The assistant (617) may be in a position to communicate with the absent invitee (601) in the event that the absent invitee (601) does not receive the notification(s) (603) sent directly to the absent invitee (601) by the conferencing service module (103).

Figure 7:
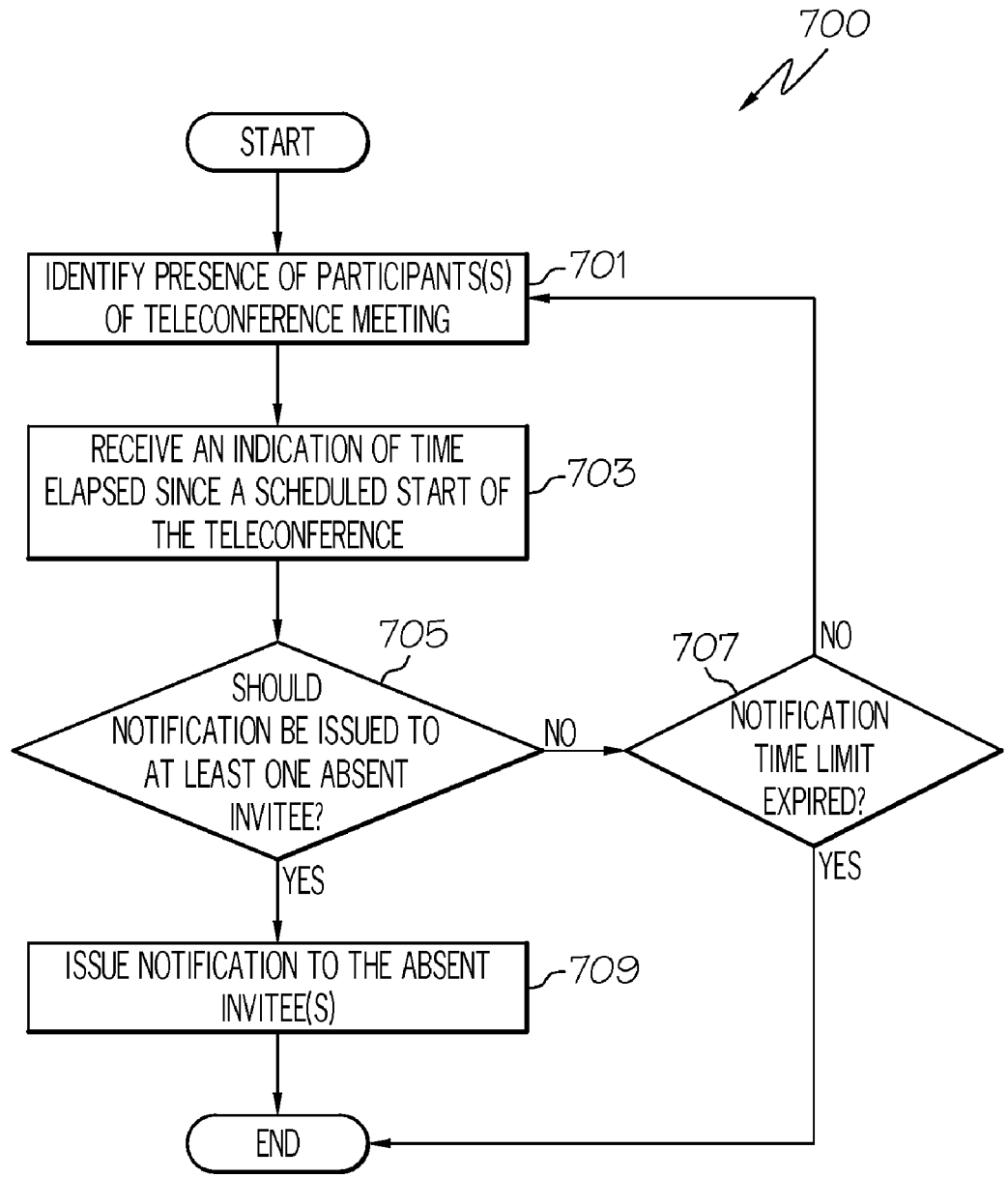
FIG. 7 is a flowchart diagram showing an illustrative teleconferencing method, according to one exemplary embodiment of principles described herein.

With reference now to FIG. 7, a flowchart diagram is shown of an illustrative teleconferencing method (700). The method (700) may be performed by a conferencing service module or other computing device or group of computing devices. The illustrative method (700) may include identifying (step 701) the presence of one or more participants in a scheduled teleconference meeting. The participants may be identified using conventional or custom identification methods, such as dialed digit pass codes, voice recognition, face recognition, login credentials, internet protocol (IP) or other network addressing, and the like. An indication may be received (step 703) of an amount of time that has elapsed since a scheduled start of the teleconference. This indication may be provided by a hardware or software clock.

Responsive to the indication, it may determined (decision 705) whether a notification should be sent to at least one absent invitee. In certain embodiments, this determination may be made based on whether a grace period has expired for each absent invitee. Additionally or alternatively, a rank of the absent invitee, mandatory or optional participant status of the absent invitee, moderator status of the absent invitee, and/or any other criteria may be used to make the determination as may suit a particular application of the principles described herein.

In the event that it is determined (decision 705) that the notification should be sent to the absent invitee, the notification may be issued (step 709) to the absent invitee, consistent with principles described previously. In certain embodiments, multiple notifications may be sent to a single absent invitee depending on, for example, a response or lack thereof received from the absent invitee. Additionally or alternatively, the notification may be issued (step 709) to the absent invitee via a human assistant receiving an electronic or other automatic notification.

In the event that it is determined (decision 705) that the notification should not be sent to the at least one absent invitee, it may be determined (decision 707) if a notification time limit has expired. If the time limit has expired, the method (700) may be terminated. However, in the event that the notification time limit has not expired (decision 707), the method (700) may be re-executed.

Figure 8:
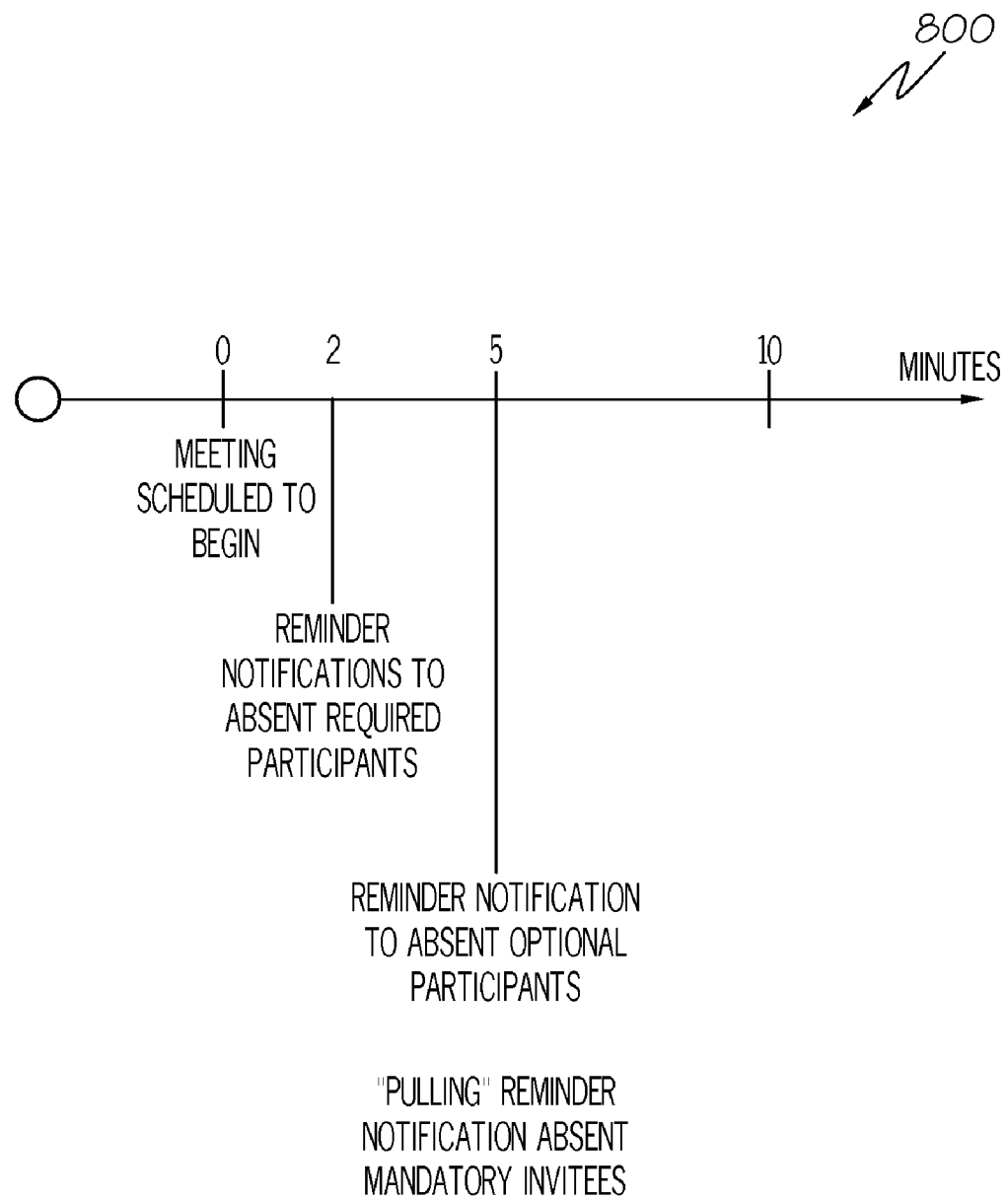
FIG. 8 is a diagram of an illustrative timeline of events in an illustrative teleconferencing method, according to one exemplary embodiment of principles described herein.

With reference now to FIG. 8, a diagram of an illustrative timeline (800) is shown of events according to one exemplary embodiment of the above method (700, FIG. 7). In the present example, events along the timeline are measured in minutes with respect to the scheduled start of a teleconference meeting. Hence, at 0 minutes, the teleconference meeting is scheduled to begin. After 2 minutes have elapsed since the scheduled start of the teleconference meeting, a first grace period may expire for required participants in the teleconference meeting, and reminder notifications may be issued to each absent invitee that has been designated as a mandatory or required participant in the teleconference meeting. After 5 minutes have elapsed since the scheduled start of the teleconference meeting, a first grace period may have expired for optional participants in the teleconference meeting, and reminder notifications may be issued to each absent invitee that has been designated as an optional participant. Additionally at the 5 minute mark, a "pulling" reminder notification may be issued to all absent invitees designated as mandatory participants that have still not joined the teleconference meeting. The "pulling" reminder notification may provide the recipients with the means to directly join the teleconference meeting, as described in more detail above with respect to FIG. 5.

Figure 9:
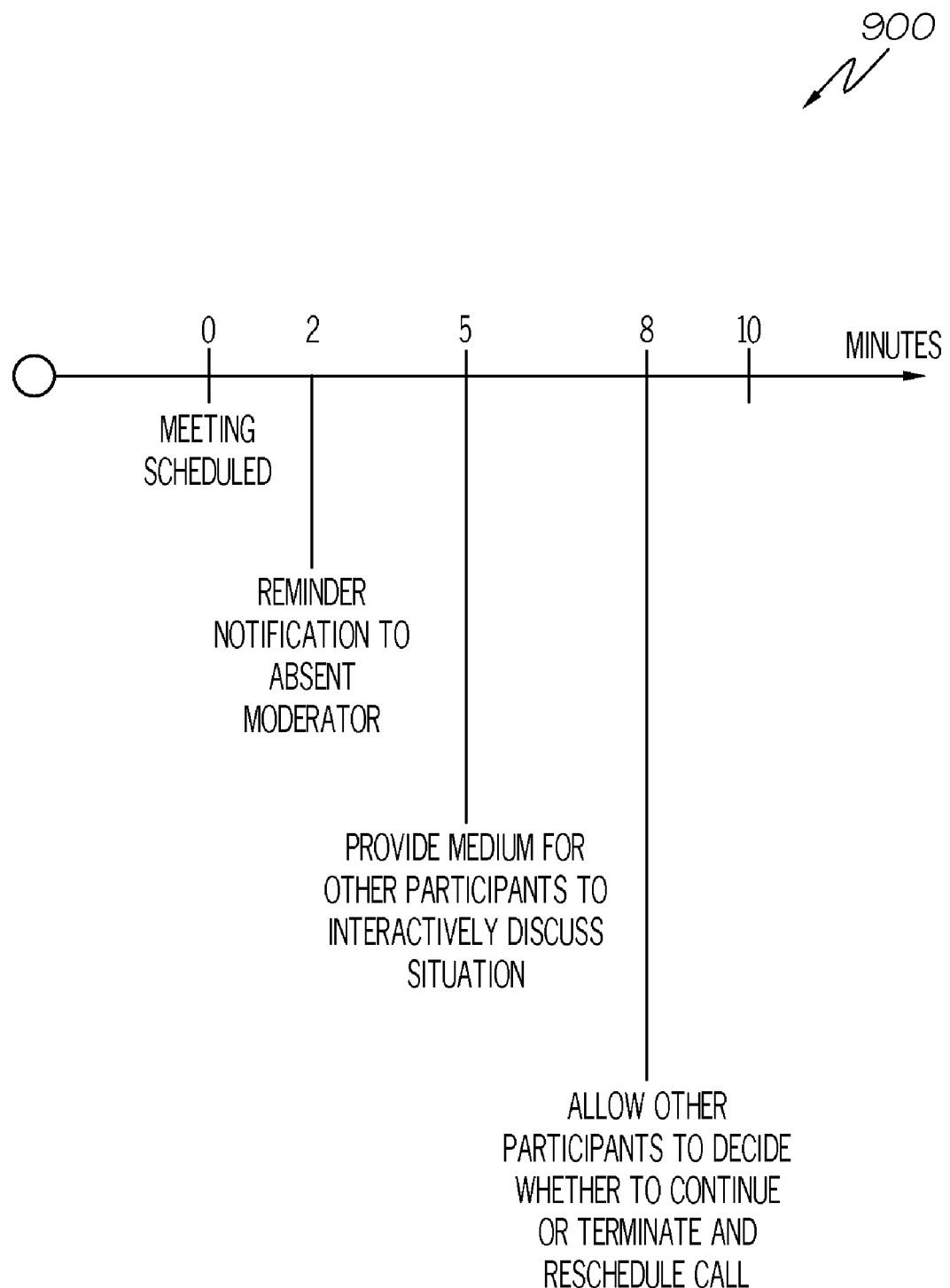
FIG. 9 is a diagram of an illustrative timeline of events in an illustrative teleconferencing method, according to one exemplary embodiment of principles described herein.

With reference now to FIG. 9, a diagram of an illustrative timeline (900) of events according to another exemplary embodiment of the above method (700, FIG. 7) is shown. The present example illustrates steps that may be taken if a designated moderator in the teleconference meeting is absent. After a two minute grace period, the absent moderator may be issued a reminder notification. This may be a "pulling notification" that provides a direct means for the moderator to join the teleconference. After five minutes have expired, a medium may be provided for other participants to interactively discuss the situation. In certain telephone embodiments, a dial tone pass code may be entered automatically for the moderator to enable other participants to speak with each other by telephone. In certain computer-based embodiments, participants may be provided with an interactive chat option and/or videoconference option to discuss the situation. After the expiration of eight minutes, the present participants may be prompted by the conferencing module to decide whether to continue or terminate and reschedule the teleconference meeting. In certain embodiments, a conferencing service module may be configured to automatically reschedule the teleconference meeting if the moderator has been absent for more than eight minutes or in the event that the present participants elect to reschedule the teleconference meeting.

Figure 10:
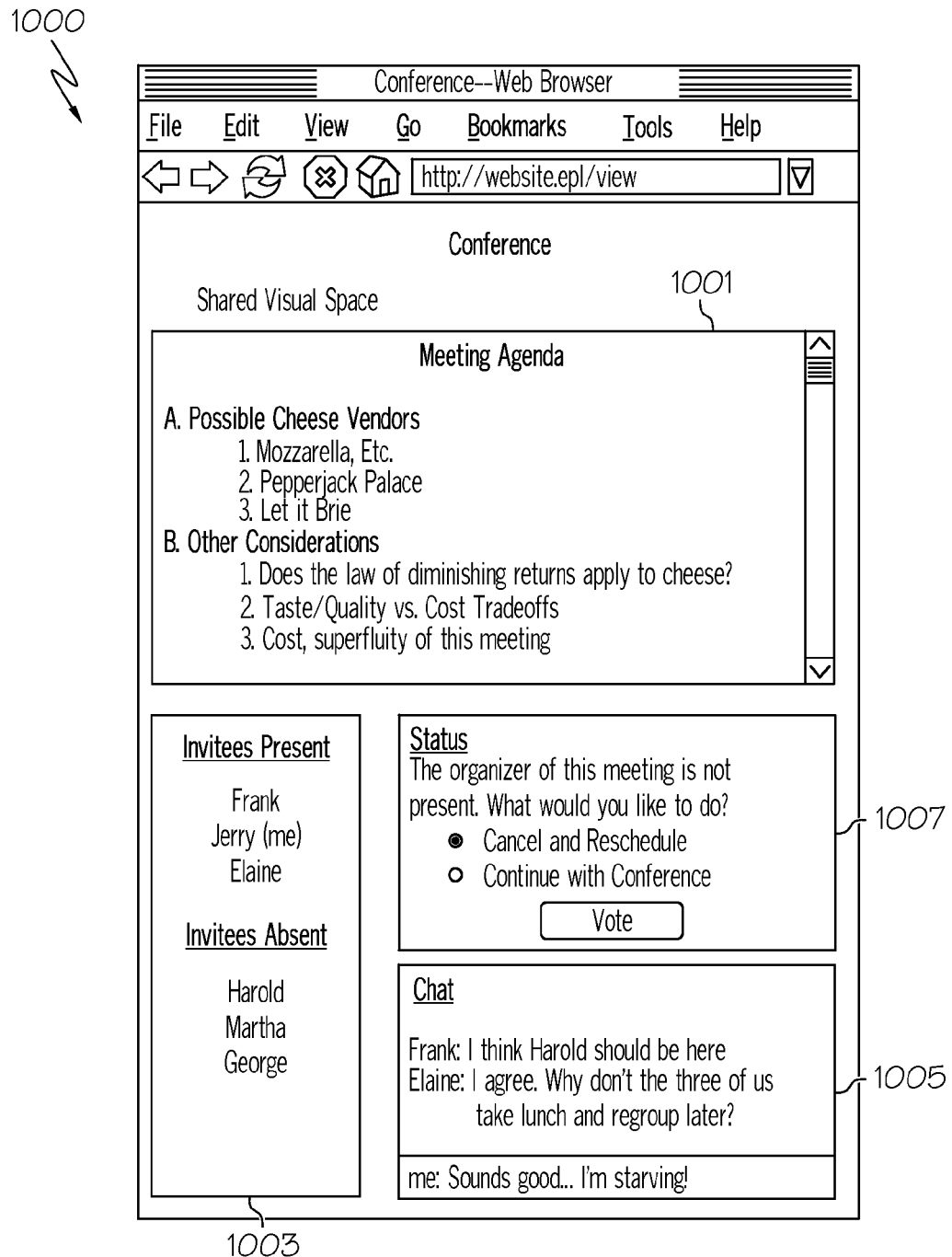
FIG. 10 is a diagram of an illustrative window in a user interface of an illustrative teleconferencing system, according to one exemplary embodiment of principles described herein.

Referring now to FIG. 10, a diagram is shown of an illustrative window (1000) in a visual user interface of an illustrative teleconferencing system. In certain embodiments, the illustrative window (1000) may be an Internet conferencing website displayed in an Internet browser. The window (1000) may include a shared visual space (1001) in which participants may view meeting materials together. A status module (1003) in the window (1000) may display which of the invitees to the teleconference meeting are present and which are absent. A chat module (1005) may allow the participants to view and send textual messages to other participants. A voting module (1007) may interactively poll the present participants. For example, in the event that a teleconference meeting moderator is absent from the meeting, the present participants may use or be prompted by the voting module (1007) to elect whether to proceed with the teleconference meeting or cancel and reschedule the meeting.

Figure 11:
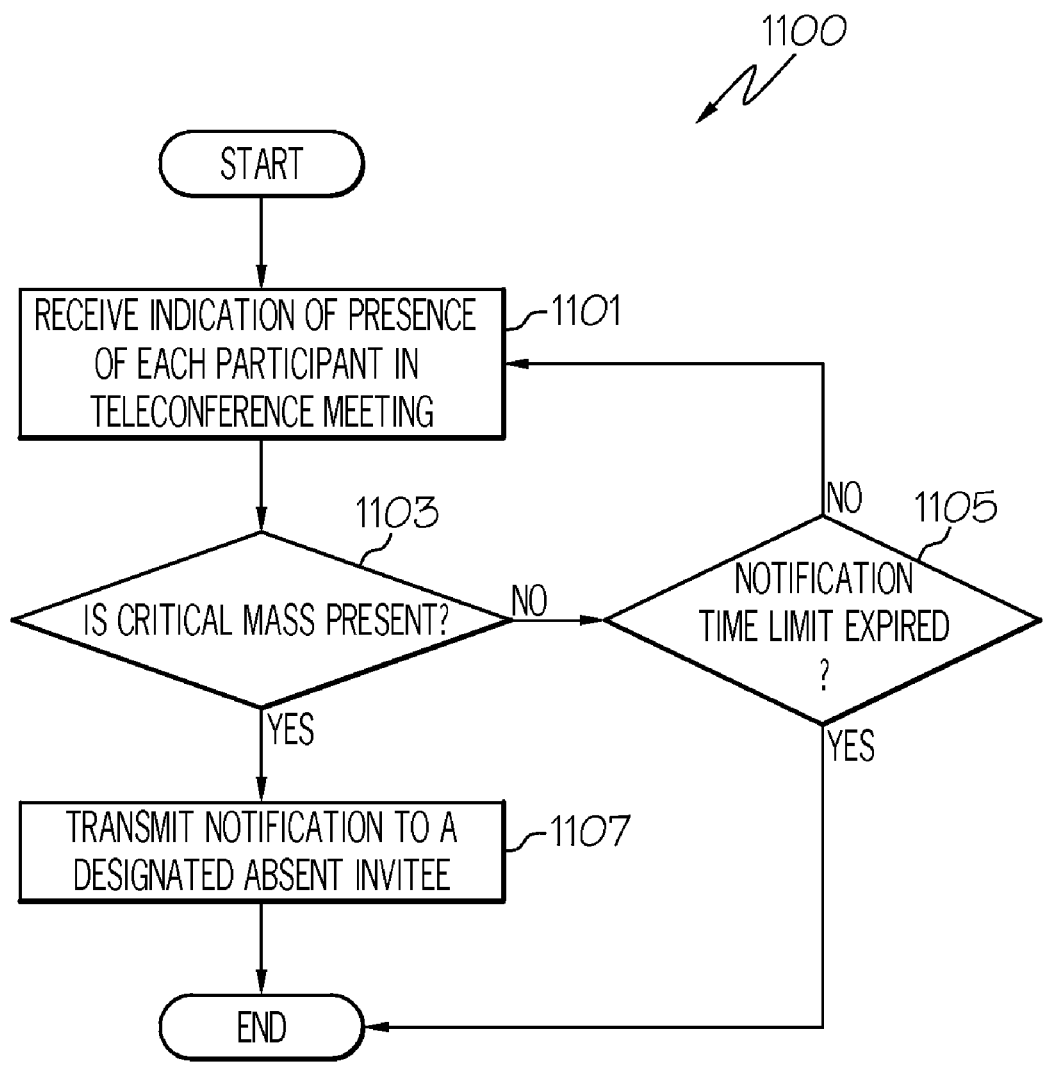
FIG. 11 is a flowchart diagram showing an illustrative teleconferencing method, according to one exemplary embodiment of principles described herein.

With reference now to FIG. 11, a flowchart is shown of another illustrative method (1100) of teleconferencing. In the present method (1100), an indication of the presence of each participant in a teleconference meeting is received (step 1101) using participant identification techniques as described previously. Responsive to the indication, a determination is made (decision 1103) whether a critical mass of participants is present at the teleconference meeting. A critical mass may be determined by a predetermined group of specific invitees, a predetermined number of invitees, representation from certain groups in a hierarchy, or any other criteria that may suit a particular application of the principles described herein. If such a critical mass is determined to be present, a notification is issued (step 1107) to a designated absent invitee. If not, it is determined (decision 1105) whether a notification time limit has expired. In the event that the time limit has expired, the method (1100) may terminate. In the event that the time limit has not expired, the method (1100) may be recommenced.

Embodiments of the present method (1100) may be used, for example, in circumstances where a high-ranking executive prefers to not join a teleconference meeting until a required group of colleagues has joined. Thus, the high-ranking executive may not join the scheduled teleconference meeting until he or she has received a notification that a required group of participants is present at the teleconference meeting, thereby allowing the executive to preserve the time used in gathering the required participants for other work.

Figure 12:
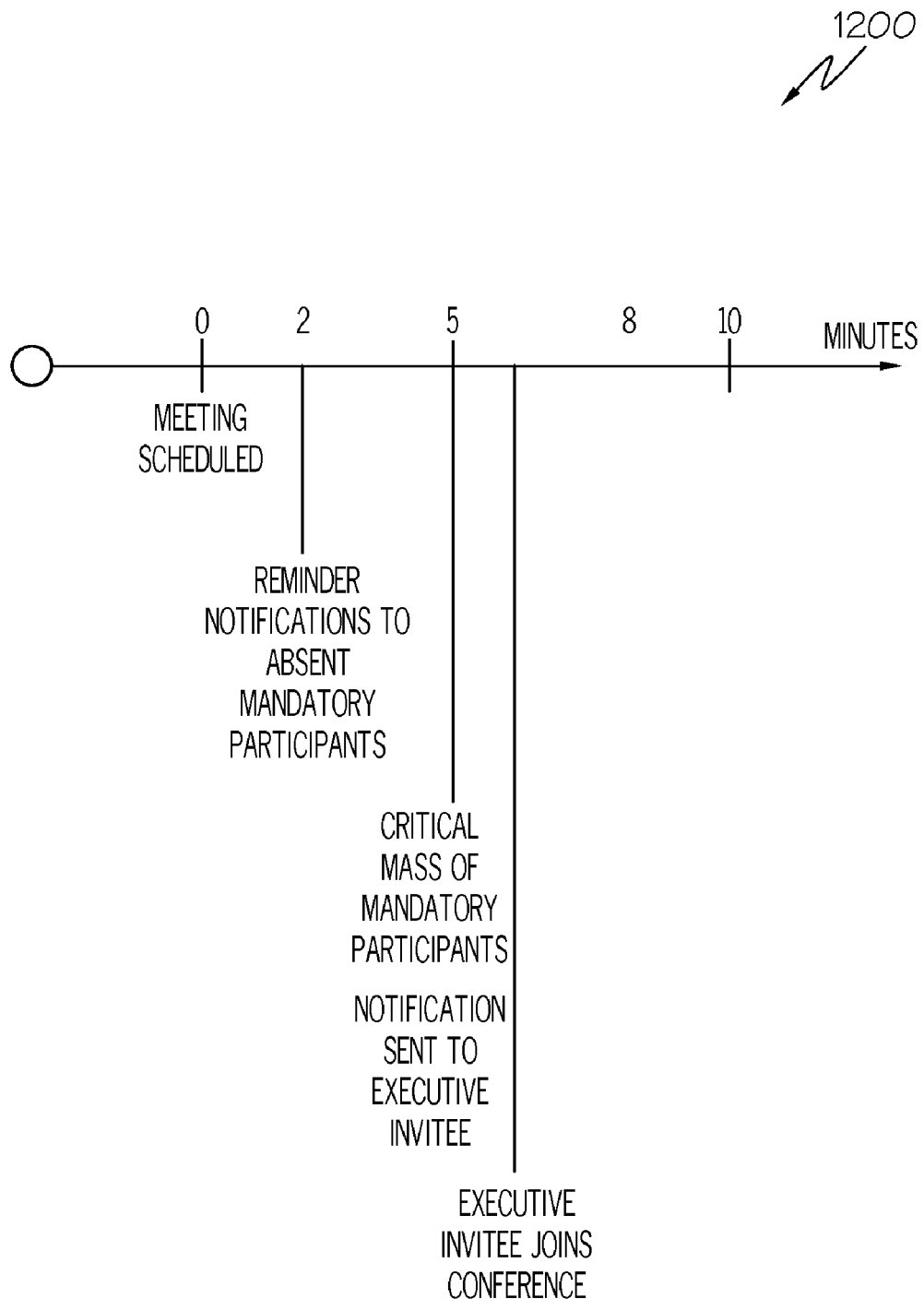
FIG. 12 is a diagram of an illustrative timeline of events in an illustrative teleconferencing method, according to one exemplary embodiment of principles described herein.

With reference now to FIG. 12, a diagram is shown of an illustrative timeline (1200) of one such embodiment of previous method (1100, FIG. 11). In the present example, after two minutes have elapsed from the scheduled start time of a teleconference meeting, reminder notifications are sent to absent invitees designated as mandatory participants. After five minutes have elapsed and a critical mass of the mandatory participants have joined the teleconference meeting, a notification may be sent to an executive invitee, who may join the teleconference meeting shortly thereafter.

Figure 13:
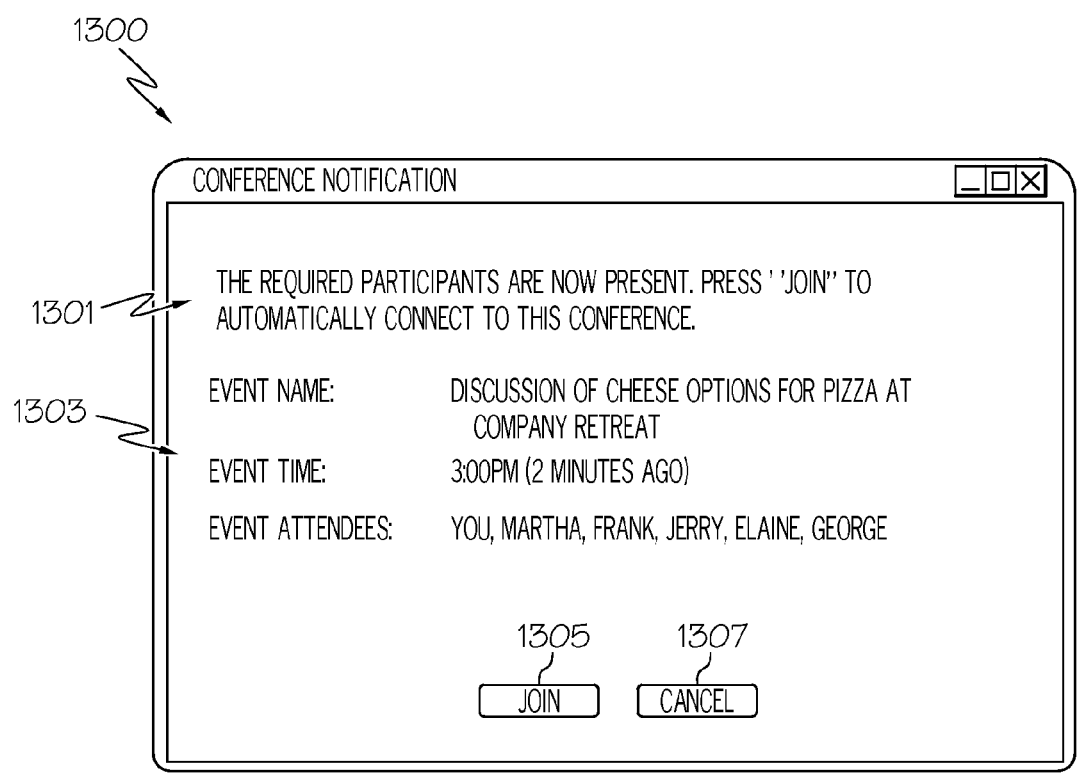
FIG. 13 is a diagram of an illustrative notification in a teleconference system, according to one exemplary embodiment of principles described herein.

With reference now to FIG. 13, a diagram of an illustrative notification (1300) is shown according to one exemplary embodiment of the principles described above. The present notification (1300) is an instant message window configured to be displayed by a computing device of an executive invitee to a teleconference meeting, in the context of the method (1100, FIG. 11) and timeline (1200, FIG. 12) described previously. It will be understood that other forms of notifications, including, but not limited to, textual messages, email messages, telephone notifications, and the like may be used with respect to these principles, as described above.

The present notification (1300) may be configured to display a message (1301) informing the executive invitee that all of, or a critical mass of, the required participants have joined the teleconference meeting. The notification (1300) may also be configured to provide details (1303) regarding the teleconference meeting in addition to "join" (1305) and "cancel" (1307) buttons to allow the executive invitee to selectively join the teleconference meeting or disregard the notification (1300). In the event that the executive invitee disregards the notification (1300), other participants of the teleconference meeting may be notified of the decision to allow them to carry on their business with the knowledge that the executive invitee will not be joining the teleconference meeting.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method, comprising:
   receiving an indication of at an elapsed time since a scheduled teleconference meeting start and current attendance at said teleconference;
   determining from said indication and a grace period rule whether to issue a notification to an absent invitee of said teleconference, wherein different grace period rules are applied to different absent invitees of said teleconference; and
   selectively issuing said notification to said absent invitee based on the determination.

2. The method of claim 1, wherein said notification comprises at least one of: an instant message, an email message, a telephone call, a text message to a mobile device, and a recorded audio message.

3. The method of claim 1, wherein said notification is issued to said absent invitee by a system configured to host said teleconference meeting.

4. The method of claim 3, further comprising joining said absent invitee to said teleconference meeting through a device with which said absent invitee receives said notification.

5. The method of claim 1, wherein said notification is issued to said absent invitee via a designated contact of said absent invitee.

6. The method of claim 1, wherein said determining from said notification whether to issue said notification to said absent invitee comprises determining whether said elapsed time is greater than a set grace period.

7. The method of claim 1, wherein said determining from said notification whether to issue said notification to said absent invitee comprises determining whether said absent invitee is designated as a mandatory participant in said teleconference meeting.

8. The method of claim 1, further comprising identifying at least one participant in said teleconference meeting.

9. The method of claim 8, wherein said determining from said notification whether to issue said notification to said absent invitee comprises determining whether a specific number of invitees have joined said teleconference meeting.

10. The method of claim 8, wherein said determining from said notification whether to issue said notification to said absent invitee comprises determining whether a specific group of invitees have joined said teleconference meeting.

11. The method of claim 1, further comprising alerting at least one participant in said teleconference meeting that said notification has been issued to said absent invitee.

12. The method of claim 11, further comprising prompting present participants of said teleconference meeting to decide whether to continue said teleconference meeting.

13. The method of claim 12, wherein prompting said present participants of said teleconference meeting to decide whether to continue said teleconference meeting comprises conducting an electronic poll of said present participants.

14. The method of claim 10, further comprising prompting participants of said teleconference meeting to reschedule said teleconference meeting.

15. A teleconference system comprising:
a plurality of conferencing devices; and
a conferencing service module communicatively coupled to said conferencing devices;
wherein said conferencing service module is configured to determine if an invitee of a teleconference meeting is absent and issue a notification to said invitee in response to a predetermined set of conditions being met said conditions comprising different rules applying to different invitees of the teleconference meeting.

16. The teleconference system of claim 15, wherein said conferencing service module is communicatively coupled to at least one of: a computing device of said absent invitee, a computing device of an assistant of said absent invitee, a telephone of said absent invitee, a telephone of an assistant of said absent invitee, a personal electronic device of said absent invitee, and a personal electronic device of an assistant of said absent invitee.

17. The teleconference system of claim 15, wherein said conferencing devices comprise at least one of: telephones, personal computers, video cameras, screens, microphones, and speakers.

18. The teleconference system of claim 15, wherein said predetermined set of conditions comprise at least one of: a predetermined amount of elapsed time from a scheduled teleconference meeting start, a predetermined number of participants in said teleconference meeting, and a specific predetermined group of participants in said teleconference meeting.

19. A computer program product for teleconferencing, the computer program product comprising:
a computer usable storage medium having computer usable program code embodied therewith, the computer usable program code comprising:
computer usable program code configured to receive an indication of at least one of an elapsed time since a scheduled teleconference start and attendance of said teleconference;
computer usable program code configured to determine from said indication and a grace period rule whether to issue a notification to an absent invitee of said teleconference, wherein difference grace period rules are applied to different absent invitees of said telelconference; and
computer usable program code configured to issue said notification to said absent invitee based on the determination.

20. The computer program product of claim 19, wherein said notification comprises at least one of: an instant message, an email message, a telephone call, a text message to a mobile device, and a recorded audio message.

* * * * *